US012769153B2

(12) United States Patent
Monvoisin et al.

(10) Patent No.: US 12,769,153 B2
(45) Date of Patent: Oct. 20, 2026

(54) OPTICAL ARTICLE HOLDING DEVICE

(71) Applicant: Essilor International, Charenton-le-Pont (FR)

(72) Inventors: Antoine Monvoisin, Beire le Fort (FR); Pierre Kress, Antony (FR)

(73) Assignee: Essilor International, Charenton-le-Pont (FR)

( * ) Notice: Subject to any disclaimer, the term of this patent is extended or adjusted under 35 U.S.C. 154(b) by 58 days.

(21) Appl. No.: 18/580,071

(22) PCT Filed: Jul. 19, 2022

(86) PCT No.: PCT/EP2022/070165
§ 371 (c)(1),
(2) Date: Jan. 17, 2024

(87) PCT Pub. No.: WO2023/001805
PCT Pub. Date: Jan. 26, 2023

(65) Prior Publication Data
US 2024/0329432 A1 Oct. 3, 2024

(30) Foreign Application Priority Data
Jul. 19, 2022 (EP) .................................... 21306018

(51) Int. Cl.
*G02C 13/00* (2006.01)
*B29D 11/00* (2006.01)

(52) U.S. Cl.
CPC ...... *G02C 13/001* (2013.01); *B29D 11/00009* (2013.01); *B29D 11/00423* (2013.01); *B29D 11/00432* (2013.01); *B29D 11/0073* (2013.01)

(58) Field of Classification Search
CPC ........ B29D 11/00009; B29D 11/00403; B29D 11/00432; B29D 11/0073; B29D 11/00423; G02C 13/001
See application file for complete search history.

(56) References Cited

U.S. PATENT DOCUMENTS 4,783,163 A 11/1988 Breault
6,355,124 B1 * 3/2002 Blomberg ............ B29D 11/005 156/99

(Continued)

FOREIGN PATENT DOCUMENTS

CN 201400607 U 10/2015

OTHER PUBLICATIONS

International Search Report & Written Opinion mailed on Nov. 10, 2022 in PCT/EP2022/070165 filed on Jul. 19, 2022 (15 pages).

*Primary Examiner* — George R Koch
*Assistant Examiner* — Jimmy R Smith, Jr.
(74) *Attorney, Agent, or Firm* — Oblon, McClelland, Maier & Neustadt, L.L.P.

(57) ABSTRACT

Holding devices adapted for holding edged optical elements, manufacturing systems including such holding devices, and a corresponding method for manufacturing a compound optical element. The holding devices include a base for supporting a main surface of an edged optical element and either exactly three pegs or a plurality of clamps. The pegs are arranged so that two pegs are in contact with a first area of the side surface of an edged optical element positioned on the base while the remaining peg is in contact with a second area of the side surface only if a specific portion of the first or of the second area is within a specific position and orientation range about three perpendicular axes. The clamps are arranged to collectively hold an edged optical element positioned on the base by restricting its mobility with respect to three degrees of freedom.

8 Claims, 3 Drawing Sheets

(56) References Cited

U.S. PATENT DOCUMENTS

| | | | | |
|---|---|---|---|---|
| 6,473,247 | B1 * | 10/2002 | Keller | G02B 7/026 118/500 |
| 6,842,299 | B2 | 1/2005 | Duon et al. | |
| 2004/0036989 | A1 | 2/2004 | Duon et al. | |
| 2008/0289517 | A1 * | 11/2008 | Begon | B41F 17/001 101/35 |
| 2019/0077139 | A1 | 3/2019 | Matz et al. | |
| 2021/0023802 | A1 | 1/2021 | Jouard et al. | |

* cited by examiner

OPTICAL ARTICLE HOLDING DEVICE

FIELD OF THE INVENTION

The disclosure belongs to the field of optics. It generally relates to devices and systems to be used in manufacturing processes of eyewear or eyewear components.

In particular there are disclosed holding devices, manufacturing systems comprising such holding devices and a method for manufacturing a compound optical element using such manufacturing systems.

BACKGROUND OF THE INVENTION

In the ophthalmic industry, lens centering is usually performed by locating the optical center of a lens using a focimeter or using micro engravings. Once the optical center is located, a central dot is printed on the lens using print tips. This central dot is then used as a reference point for any further subtractive or additive manufacturing operation.

However, this well-known approach is not fully suitable for all applications.

Indeed, for example when manufacturing electrochromic cells to be encapsulated in an optical lens, it is known to use edged lenses as electrodes, separated by a material having electrochromic properties. In this framework, a silver lacquer or a structural glue may be applied along a closed path running around most of the surface of one such edged lens. Then, after applying the lacquer or glue, it is possible to assemble both edged lenses and the electrochromic material.

Similarly, manufacturing optical lenses comprising liquid crystals may also involve injecting an adhesive material close to the edge of an edged lens serving as a substrate.

The closed path is typically registered in a robot, assuming that the edged lens is positioned in a specific desired, position, so as to delimit a closed surface extending to a specific distance from the edge of the edged lens. As a result, any translation or rotation of the edged lens compared to the desired position induces an incorrect path positioning.

In this context, there is a need for holding edged optical elements in a specific position and orientation in order to always get the same positioning irrespective of the operator.

This allows minimizing internal defects of compound optical elements comprising such an edged optical element. This further allows accurately positioning, in a reproducible manner, a closed path of adhesive material having a controlled width onto such an edged optical element.

In addition, when mass producing edged lenses having the same nominal dimensions, the actual dimensions of the produced lenses, in terms of height, length, and width, may differ slightly. With the well-known approach of using a central dot as a reference point, even slight variations in the size of edged lenses, smaller than a tenth of a millimeter, induce an unacceptable position uncertainty, when seeking to apply lacquer, glue or any other adhesive material, close to the edge of such edged lenses.

Therefore, there is a need for holding edged optical elements in a specific position and orientation in order to always get the same positioning irrespective of the slight variations of dimensions that may occur when mass producing optical elements having the same nominal dimensions.

SUMMARY OF THE INVENTION

The invention is defined by the appended independent claims. Additional features and advantages of the concepts herein disclosed are set forth in the description which follows.

The present disclosure aims at improving the situation. To this end, the present disclosure describes a holding device adapted for holding an edged optical element comprising two opposing main surfaces and a side surface comprising a top area, a nasal area adjacent to the top area, a bottom area adjacent to the nasal area and a temporal area adjacent to the top and bottom areas, the holding device comprising:

- a base for supporting a main surface of the edged optical element, and
- exactly three pegs extending from the base and respectively positioned in a contact position defined so that, when the edged optical element is positioned onto the base and two of the three pegs are in contact with a first area among the top, nasal, bottom and temporal areas, the remaining peg is in contact with a second area among the top, nasal, bottom and temporal areas, the second area being adjacent to the first area, only if a specific portion of the first or of the second area is within a specific position and orientation range about three perpendicular axes.

Due to the structural configuration of the holding device, by positioning an edged optical element having a given shape and given nominal dimensions in between the pegs, said edged optical element is necessarily, repeatably, held by the pegs and the base in a narrow position and orientation range.

More precisely, the edged optical element being positioned on a planar surface, such as a top surface of a base, extending in a horizontal plane, the pegs allow restricting movement of the edged optical element, be it in translation or rotation, within such planar surface.

This allows accurately controlling, at least, the position and orientation of a specific portion of the optical element, located close to its side, in between one of the pegs in contact with the first area and the peg in contact with the second area.

A consequence is that when seeking to conduct manufacturing operations with the held optical article, any shift with respect to a desired position and/or orientation of said specific portion is effectively prevented.

In an example, the collective spread of the three pegs is a result of an optimization problem relating to a minimization of the specific position and orientation range about the three perpendicular axes for the edged optical element when positioned onto the base.

Solving such optimization problem allows finding the collective spread of the pegs which optimally restricts the allowed position and orientation range of the edged optical element.

For example, a plurality of candidate vectors for the positions of the three pegs may be considered. Each candidate vector defines the positions of two pegs as being in contact with a corresponding point of the first area and the position of the third peg as being in contact with a corresponding point of the second area when the edged optical element has a specific predefined position and orientation. For each candidate vector, it is possible to simulate whether the edged optical element would be held rather tightly or loosely. Specifically, it is for instance possible to check whether a given position offset of the edged optical element would still allow its side surface to remain within the three pegs.

In an example, the edged optical element comprises an edged spectacle lens.

Such edged spectacle lens may for example be coated and/or be combined with various additional optical components, in order for example to be made part of an electrochromic cell. Such edged optical spectacle may further be marked. Any such operations may be conducted before the edged spectacle lens is held by the holding device, or while the edged optical element is held by the holding device.

In an example, at least one of the three pegs is moveable between the contact position and a release position.

The edged optical element may easily be introduced on the base and in between the pegs while one or more of the pegs are in such release position. Then, simply by moving all pegs to the contact position, the edged optical element becomes held as desired. Finally, by moving one or more pegs back into the release position, the edged optical element may easily be recovered. The full process may be conducted without any risk of chipping the edged optical element by forcibly inserting it between the pegs all positioned in their contact position, or by forcibly removing it from the pegs all positioned in their contact position.

In another aspect, it is proposed a manufacturing system comprising:

- a first holding device as defined above, and
- an inlet positioned so as to face the first area or the second area of the side surface of a first edged optical element when held by the first holding device,
- the manufacturing system being configured to apply adhesive material from the inlet onto said first edged optical element, when held by the first holding device.

For example, the adhesive material may be reliably applied along a preset path running close to the edge of the first edged optical element. This allows gluing, for example, another component onto the first edged optical element, as an extension of the side surface of the first edged optical element, with a smooth surface transition.

In an example, the manufacturing system may further comprise:

- a second holding device as defined above,
- the manufacturing system being configured to manufacture a compound optical element by superimposing a second optical element held by the second holding device onto the first optical element held by the first holding device after application of the adhesive material.

As a result, the manufacturing system allow gluing together two optical elements having the same nominal dimensions while ensuring that at least a specific part of their side surface overlap close to perfectly. In other words, when positioning the compound optical element on a flat, horizontal, base, the orthogonal projection of the outline of the main surface of the first optical element on the base matches the orthogonal projection of the outline of the main surface of the second optical element on the base.

In another aspect, it is proposed a holding device comprising:

- a base for supporting a main surface of at least one edged optical element, and
- a plurality of clamps configured so that, when an edged optical element is positioned on the base, the clamps collectively abut against a side surface of the edged optical element,
- the clamps being configured so that, when the edged optical element is positioned on the base, the clamps collectively hold the edged optical element by restricting mobility with respect to three degrees of freedom By abutting against a side surface of the edged optical element, it is meant that the clamps are arranged so that when the edged optical element is placed in between the clamps, each clamp comprises one or more contact points with the side surface of the edged optical element. Each contact point acts as a stop preventing translation of the edged optical element in a given direction.

Collectively, the contact points prevent translation of the edged optical element on the base, in all directions parallel to the base, as well as rotation of the edged optical element on the base in the direction normal to the base, thus the clamps restrict mobility of the edged optical element with respect to three degrees of freedom. Moreover, the contact of the main surface against the base prevents the translation in the direction normal to the face and the rotation in all directions parallel to the face. Thus the contact with the face restricts mobility of the edged optical element with respect to three degrees of freedom.

In an example, the holding device may further comprise a gripper being configured so that, when the edged optical element is fully positioned on the base and in the clamps, the gripper takes the edged optical element to restrict mobility of the edged optical element with respect to six degrees of freedom.

The gripper grips the edged optical element so as to ensure that, when initially positioned on the base then further held by the clamps, the edged optical element can be lifted by the gripper, and the gripper keeps the position of the lens in the three rotations and the two translations normal to the displacement direction. The position of the optical element in the displacement direction is controlled by the position of the gripper.

In another aspect, it is proposed a manufacturing system comprising:

- a first holding device as defined above, and
- an inlet positioned so as to face a main surface of a first edged optical element when held by the first holding device,
- the manufacturing system being configured to apply adhesive material from the fluid inlet onto said main surface of the first edged optical element, when held by the first holding device.

In an example, the manufacturing system may further comprise:

- a second holding device as defined above,
- the manufacturing system being configured to manufacture a compound optical element by superimposing a second optical element held by the second holding device onto the first optical element held by the first holding device after application of the adhesive material.

In another aspect, it is proposed a method for manufacturing a compound optical element using a manufacturing system as defined above, the method comprising:

- holding a first edged optical element using the first holding device,
- positioning a second edged optical element by the means of the second holding device, in an initial position in relation to the first optical element,
- applying adhesive material from the inlet onto the held first edged optical element, and
- displacing, using the gripper, the second optical element from the initial position to a final position wherein the second optical element is in contact with the adhesive material layer applied on the first optical element held in the first holding device in view of manufacturing a compound optical element comprising, at least, the first edged optical element and the second edged optical element, bound together by the adhesive material.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

The present disclosure describes two different types of holding devices for holding an edged optical element. Both types of holding devices allow restricting movement of the edged optical element within a plane. In other words, translation is restricted along two perpendicular axis while rotation is restricted around a third axis perpendicular to the other two.

A possible application is described herein: such holding devices may be part of a manufacturing system configured to apply an adhesive material onto a main surface of a held optical element, and, optionally, to superimpose two edged optical elements having the same nominal dimensions and bind them together with the applied adhesive material.

Figure 1:
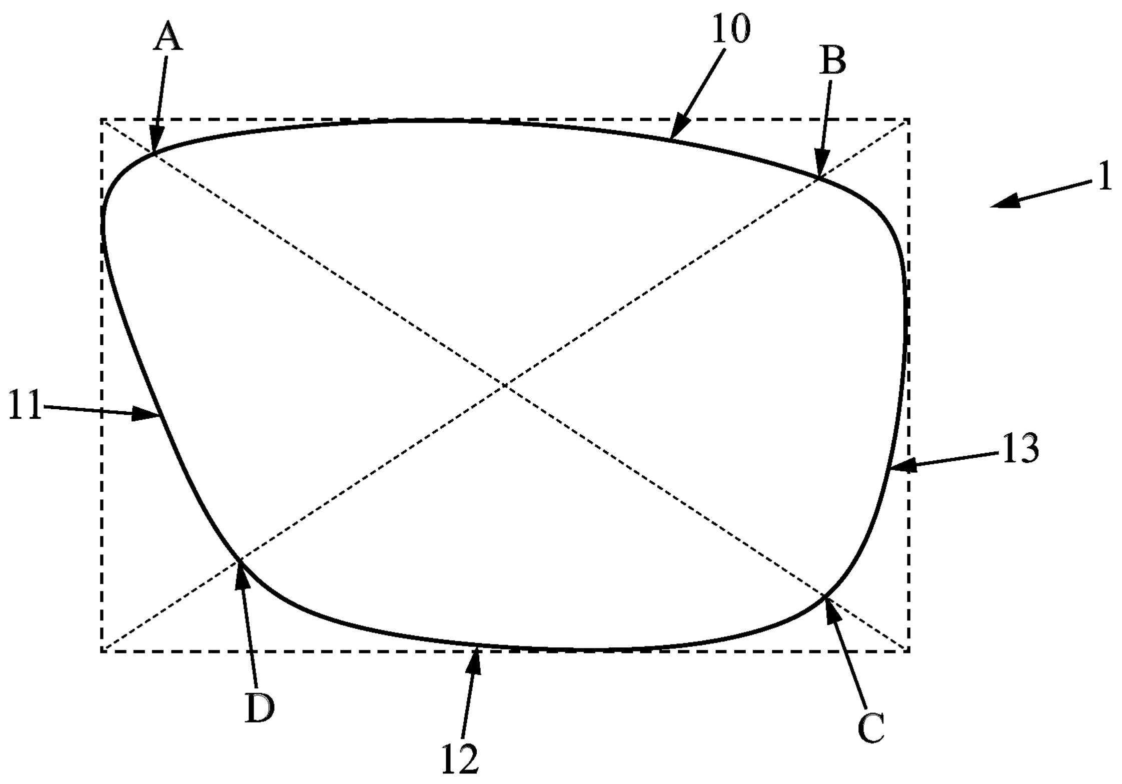
FIG. 1 illustrates an exemplary optical element and FIG. 2 depicts a tentative holding device for partially holding the optical element of FIG. 1.

It is now referred to FIG. 1, which depicts an optical element 1 made with a transparent substrate. Mineral substrates such as glass or organic substrates such as polycarbonate may be indifferently used.

In the context of the invention, the optical element 1 is an edged optical lens with a general shape corresponding to that of a spectacle lens.

The optical element 1 comprises a first main surface, or object-side surface, corresponding to the surface facing a scene when the optical element 1 is, for example, mounted on a spectacle frame and worn by a wearer.

FIG. 1 shows the optical element 1 as viewed from such a scene, when the optical element 1 is worn, as part of eyeglasses, by a wearer.

The optical element 1 further comprises a second main surface, or eyeball-side surface, which opposes the first main surface and faces the eye of the wearer when worn. The curvature of the second main surface is different than the curvature of the first main surface, which also means that the thickness of the optical element 1 is non-uniform.

With respect to the outline of the main surfaces, common spectacle lens shapes include aviator, cat-eye, round, rectangular, oval, square, etc.

Since many lens shapes are neither round nor a polygon, the outline of the main surfaces of the optical element 1 may be devoid of a straight line that may help in positioning the optical element 1, whether on its convex or on its concave main surface, for conducting further additive or subtractive manufacturing operations.

On FIG. 1, the outline of the main surfaces of the optical element 1 is shown within a rectangle depicted with dotted lines. The sides of the rectangle are respectively horizontal and vertical, assuming the optical element is worn by a wearer standing straight. The diagonals of the rectangle intersect with the optical element 1 at four points noted A, B, C and D on FIG. 1, thus delimiting four sections of the outline of the main surfaces of the optical element 1.

From point A to point B extends a top section, from point B to point C extends a temporal section, from point C to point D extends a bottom section, and from point D to point A extends a nasal section.

The top and bottom sections are respectively at the top and at the bottom of the optical element 1, assuming the optical element is worn by a wearer standing straight.

Assuming the optical element 1 is mounted on a spectacle frame in between a bridge and a temple, the nasal section is towards the bridge while the temporal section is towards the temple.

The optical element 1 further comprises a side surface, forming the edge of the optical element 1, extending from the outline of the first main surface to the outline of the second main surface.

The side surface thus comprises:

- a top area 10 extending between the top sections of the outline of the main surfaces,
- a nasal area 11 adjacent to the top area and extending between the nasal sections of the outline of the main surfaces,
- a bottom area 12 adjacent to the nasal area and extending between the bottom sections of the outline of the main surfaces, and
- a temporal area 13 adjacent to the top and bottom areas and extending between the temporal sections of the outline of the main surfaces.

Figure 2:
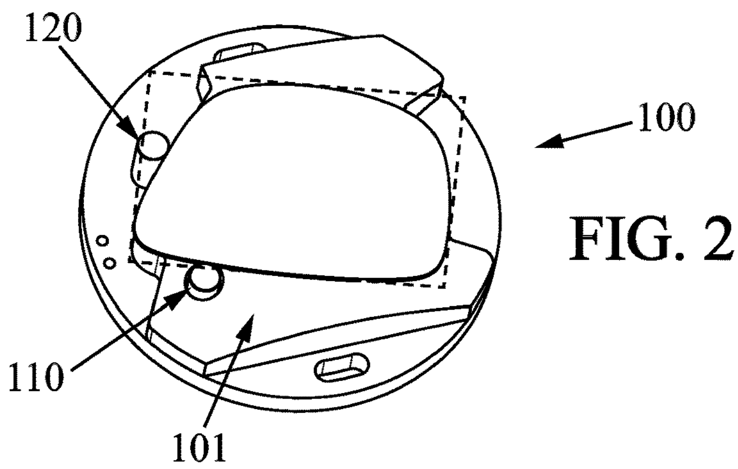

It is now referred to FIG. 2, which depicts an exemplary holding device 100 for holding the optical element 1.

The holding device 100 comprises a base 101 for supporting the optical element 1 and a plurality of pegs extending from the base 101 and acting as contact points for restricting the movement of the optical element 1, thus holding it in position.

A first peg 110 and a second peg 120 are both set in a corresponding contact position.

Such contact positions are defined as being collectively suitable for positioning the optical element 1 onto the base 101 so that the first peg 110 is in contact with a first area of the side surface of the optical element 1 while the second peg 120 is simultaneously in contact with a second area of the side surface of the optical element 1, the second area being adjacent to the first area.

More specifically, in this example, the first area is the top area 10 and the second area is the nasal area 11, which is indeed adjacent to the top area 10.

It is possible to define a frame of reference with three perpendicular axis x, y and z, so that the base 101 lies in the xy plane and both pegs substantially extend throughout a direction parallel to the z axis.

In such frame of reference, one may also define, referring to the freedom of movement of the optical element 1 in a three-dimensional space, six degrees of freedom as following:

translation along the x axis, or surge,
translation along the y axis, or sway,
translation along the z axis, or heave,
rotation around the x axis, or roll,
rotation around the y axis, or pitch, and
rotation around the z axis, or yaw.

The first peg 110 and the second peg 120, when respectively in contact with two adjacent surfaces of the side surface of the optical element 1, effectively restrict the movement of the optical element within the xy plane.

In other words, by positioning the optical element 1 on the base 101, with the nasal area 11 being against the first peg 110 and the top area 10 being against the second peg 120, said pegs act as stops, blocking unidirectional translation of the optical element 1 along the x and y axis. Thus, the first peg 110 and the second peg 120 prevent, to some extent, displacement of the optical element 1 on the base 101, that is to say unwanted surge and/or sway.

In addition, gravity holds the optical element 1 against the base 101 so that no downward translation along the z axis may occur, as well as no rotation around the x and y axis. Optionally a vacuum defined as a lesser pressure at the center of the base 101 and below the optical element 1 than above and around the optical element 1 may further contribute to holding the optical element 1 against the base 101. Thus, under gravity and, optionally, vacuum, the base 101 prevents any part of the optical element 1 to be displaced along the z axis, that is to say unwanted heave, roll and/or pitch.

However, with only these two pegs 110, 120, the orientation of the optical element 1 with respect to the z axis remains free.

Therefore, considering a holding device consisting only of the base 101, the first peg 110 and the second peg 120, an operator positioning the optical element 1 on the base 101 so that the nasal area 11 is against the first peg 110 while the top area 10 is against the second peg 120 cannot ensure that the optical element 1 has a correct, desired, orientation with respect to the z axis.

In other words, it is not possible, in this example and with such a simple setup, to ensure that a specific portion of the top area 10 or of the nasal area 11 is within a specific position and orientation range about the three perpendicular axes.

Figure 3A:
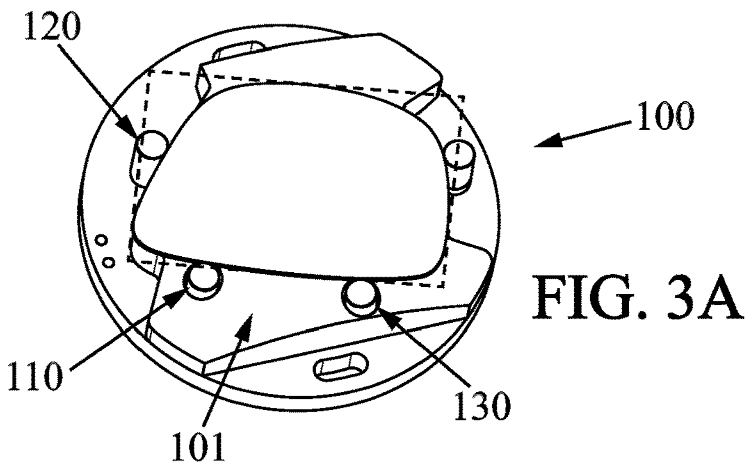
FIGS. 3A and 3B each depict a respective holding device, according to respective exemplary embodiments, for effectively holding the optical element of FIG. 1.
Figure 3B:
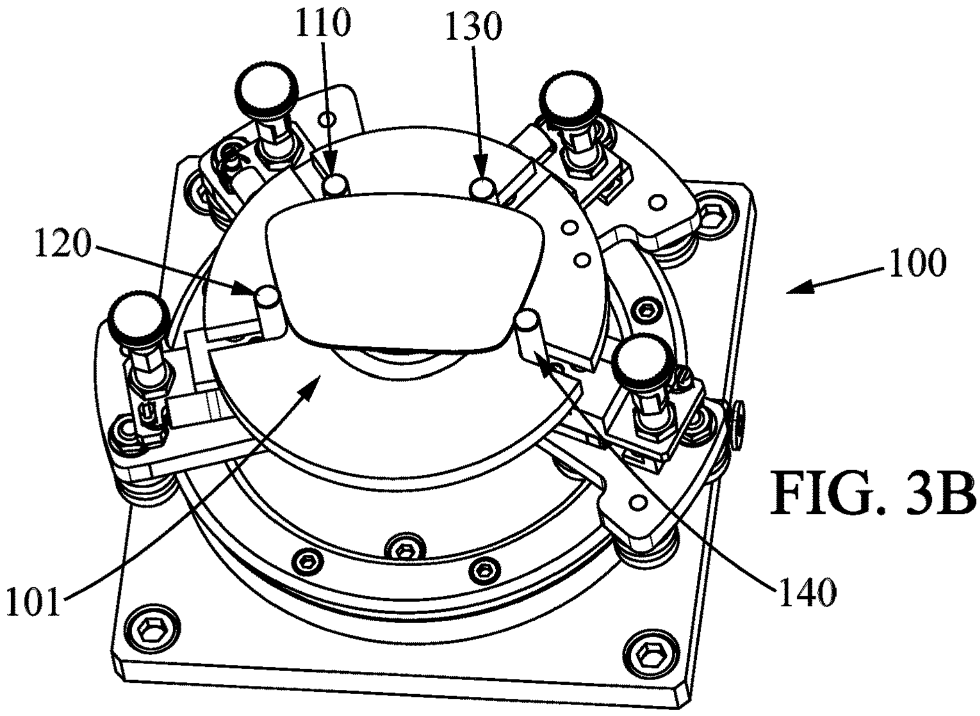

FIGS. 3A and 3B each depict another holding device 100. Both exemplary holding devices of FIGS. 3A and 3B differ from the one represented in FIG. 2, in that they further comprise a third peg 130 set in a contact position. The addition of the third peg 130 allows overcoming the above issue by restricting movement of the optical element 1 around the z axis.

The inventors have noticed that the best results were obtained when the contact position of the third peg 130 is within the same area as that of the first peg 110.

As can be seen on FIG. 3A, the first, second and third pegs may be set in fixed contact positions, specifically defined so that the first and third pegs (110, 130) may be put in contact with the bottom area of the side surface of the optical element 1 while the second peg 120 is simultaneously put in contact with the nasal area of the side surface of the optical element 1, the nasal area being adjacent to the bottom area.

Alternately, as can be seen on FIG. 3B, the respective positions of the first, second and third pegs may each be controllable between a contact position and a release position. The contact positions are thus specifically defined so that the first and third pegs (110, 130) may be set in contact with the top area of the side surface of the optical element 1 while the second peg 120 is simultaneously set in contact with the nasal area of the side surface of the optical element 1, the nasal area being adjacent to the top area.

In other words, to best restrict not only translation within the xy plane but also rotation over the z axis, it is desirable for the three pegs (110, 120, 130) to be in contact positions defined as being collectively suitable for positioning the optical element 1 onto the base 101 so that the first peg 110 and the third peg 130 are both in contact with a first area of the side surface of the optical element 1 while the second peg 120 is simultaneously in contact with a second area of the side surface of the optical element 1, the second area being adjacent to the first area.

Indeed, the contact positions of the first peg 110 and the second peg 120 allow blocking unidirectional translation of the optical element 1 along the x and y axis, while the contact position of the third peg 130 further allows blocking unidirectional rotation around the z axis.

The collective repartition of the three pegs 110, 120, 130 corresponds to an isostatic mounting, which is sufficient, by itself, to restrict the movement of the optical element 1 with respect to three degrees of freedom, while the base 101 further contributes to restrict the movement of the optical element 1 with respect to the remaining three degrees of freedom.

In addition, the inventors also have noted that, for most optical element shapes, it is desirable for the contact positions of the first peg 110 and of the third peg 130 to be as far as possible from each other, i.e. close to a respective endpoint of the first area, in order to restrict as much as possible the rotation of the optical element 1 around the z axis.

More generally, the optimal collective spread of the three pegs may be determined by defining, then solving an optimization problem relating to a minimization of the allowed position and orientation range of a portion of interest of the first area about the three perpendicular axes when the optical element 1 is positioned onto the base 101. For example, the contact position of the first peg 110 may be initially set, then the contact positions of the second peg 120 and of the third peg 130 may be jointly computed so as to minimize both the allowed translation range of the optical element 1 in the xy plane and the allowed rotation range of the optical element 1 around the z axis.

As a result, the optical element 1 may be positioned onto the holding device 100 with a high precision standard, defined so that any specific area of interest within the first or the second area may be confidently positioned with a tolerance equal to, or lower than, 0.05 mm along the x and y axis, and oriented with a tolerance equal to, or lower than, 0.1 degrees around the z axis.

The holding device 100 allows meeting the high precision standard defined above irrespective of the operator.

In addition, the holding device 100 also allows successively positioning a plurality of optical elements 1 having the same nominal dimensions while always meeting such high precision standard, even if the actual dimensions of such optical elements 1 exhibit slight variations of, for example, up to 0.1 mm around the nominal dimensions. In addition, the alignment of every optical element with respect to its ideal position is optimized close to the positions of the pegs, which means that any position discrepancy, resulting from a variation of dimensions among optical elements of same nominal dimensions, spreads far from the pegs.

Throughout this document, edged optical elements having the same nominal dimensions designate edged optical elements which 2D shape and size, in the same projection as represented on FIG. 1, is meant to be identical. This similarity does not extend to the curvature of the main surfaces which, on the contrary, may be substantially different from one such edged optical element to another, depending on the needs.

Indeed, a lens manufacturer may wish to:

- manufacture successively a plurality of edged optical elements having different widths, or different dioptric functions, but the same outline, or manufacture a compound optical element by superimposing two edged optical elements having different widths, or different dioptric functions, but the same outline.

Additional pegs set in a contact position, beyond a total number of three, would lead to a hyperstatic mounting, which would be detrimental to the sought objective of holding the optical element 1 within a precise position and orientation range. A hyperstatic mounting would also pose a risk of chipping the side surface when eventually removing the optical element 1 from the holding device.

However, as shown on FIG. 3B, the holding device 100 may comprise a fourth peg 140 set in a release position. This means that the fourth position shall not be in contact with the optical element 1 when the latter is positioned to be simultaneously in contact with the first, second and third pegs 110, 120, 130. The fourth peg 140 may thus serve simply to prevent the optical element 1 from sliding off the holding device.

In addition, the holding device 100 may comprise, for each of the first, second and third pegs 110, 120, 130, a corresponding position adjustment element.

Such a position adjustment element may allow, for example, setting the contact position of the corresponding peg for a given optical element 1 based on the nominal dimensions of said optical element 1. Therefore, the holding device 100 may be configured on demand by setting the contact positions of the first, second and third pegs 110, 120, 130, for any possible shape of the optical element 1 to be held.

Such a position adjustment element may allow, for example, moving the corresponding peg between the contact position set for a given optical element 1 and a release position.

The release position of a peg is a position in which said peg is not in contact with the optical element 1 when said optical element 1 is positioned in between the contact positions of the three pegs 110, 120, 130.

Geometrically, the contact positions of the three pegs 110, 120, 130 may be assimilated to three points of a circle, i.e. to three points at the same distance r of the center of said circle. The release position of any of the three pegs 110, 120, 130 may be assimilated to a corresponding point which distance from the center C of the circle is greater than r.

One or more of the three pegs may be set in a release position when different types of conditions are met.

As a consequence, it is possible to:

first, set the first, second and third pegs 110, 120, 130 in their respective contact position, then, position the optical element 1 onto the base 101 and in contact with all three pegs 110, 120, 130 in their respective contact position in order to ensure that a specific portion of the first area of the side surface of the optical element 1 is in a desired position and orientation range, the base 101 thus being specific to the geometry of the optical element 1 and allowing setting the pegs in their optimal positions with regard to said geometry of the optical element 1, then, when at least one condition is met, release the optical element 1 from the holding device 100 by moving the first, second and third pegs 110, 120, 130 from their respective contact position to their respective release position.

An exemplary condition is whether a given manufacturing operation is complete. Indeed, the purpose of the holding device 100 may be, for example, holding the optical element 1 close to a specific position value and a specific orientation value until one or more manufacturing operations are complete. Once such exemplary condition is met, the optical element 1 may be kept in its current position using vacuum. It may then be possible, once such condition is met, to move one or more of the pegs 110, 120, 130 towards a corresponding release position in order to allow an operator to remove the optical element 1 from the holding device 100.

In another example, the holding device 100 may form part of a closable chamber. Once the optical element 1 is positioned onto the base 101 and in contact with all three pegs 110, 120, 130 in their respective contact position, it is possible to close the chamber and put it under vacuum so as to passively hold the optical element 1 in its current, desired, position and orientation. Another exemplary condition may then be whether the closable chamber is closed and under vacuum. Once such condition is met, one or more of the pegs 110, 120, 130 may then be moved towards a corresponding release position in order, for instance, to:

minimize clutter, and/or minimize risk of chipping the optical element 1, and/or generally facilitate the conduct of additive and/or subtractive manufacturing operations using the optical element 1 as base element.

Structurally, the holding device 100 is designed so that, when the holding device holds an edged optical element 1, none of the parts of the holding device is in contact with the upper main surface of the held edged optical element 1. This is purposive.

Indeed, when manufacturing an optical lens, it is common to apply a coating on a main surface of such lens, or of an element of such lens.

For example, an antireflective coating may be applied.

When manufacturing an electrochromic cell, two opposing edged optical elements typically serve as electrodes. To do so, at least part of their inner main surface is usually coated with a transparent conductive coating such as an ITO (indium-tin oxide) coating.

In this regard, if a main surface of the edged optical element 1 is coated, it is actually important to avoid any physical contact with such coating in order to minimize the risk of forming a defect.

It is further proposed a manufacturing system comprising a holding device 100 as defined above and an inlet connected to a supply of adhesive material. The adhesive material may for example be glue, or a silver lacquer when conductive properties are sought. The adhesive material may be transparent and/or may have a refractive index close to that of the edged optical element 1 for the purpose of minimally altering dioptric function and/or transmission function.

The purpose of the adhesive material is to allow binding the edged optical element 1 to another optical element.

The purpose of the inlet is to allow applying the adhesive material onto a main surface of the edged optical element 1, close to its edge, when said optical element 1 is positioned onto the base 101, and held by the pegs 110, 120, 130, of the holding device 100.

Therefore, the inlet is positioned so as to face a section of the outline of a main surface of the edged optical element 1 that corresponds to the first area or to the second area of the side surface of said edged optical element when held by the holding device 100.

The manufacturing system is configured to apply the adhesive material from the inlet onto said edged optical element 1, when held by the holding device 100.

The manufacturing system may be further configured to control the relative position of the inlet with respect to the holding device 100 holding the edged optical element 1. For example, motors may be used to control either the xy position of the holding device 100 or the xy position of the inlet in the frame of reference defined above. As a result, the manufacturing system may for instance allow applying the adhesive material onto a main surface of the edged optical element 1 following a predetermined closed path.

The manufacturing system may comprise two identical holding devices 100.

Therefore, the holding devices 100 may each hold an optical element 1 having the same nominal dimensions.

The manufacturing system may be further configured to allow controlling the relative position of the holding devices 100 with respect to each other so that one of the optical elements 1 overlaps the other.

Figure 5:
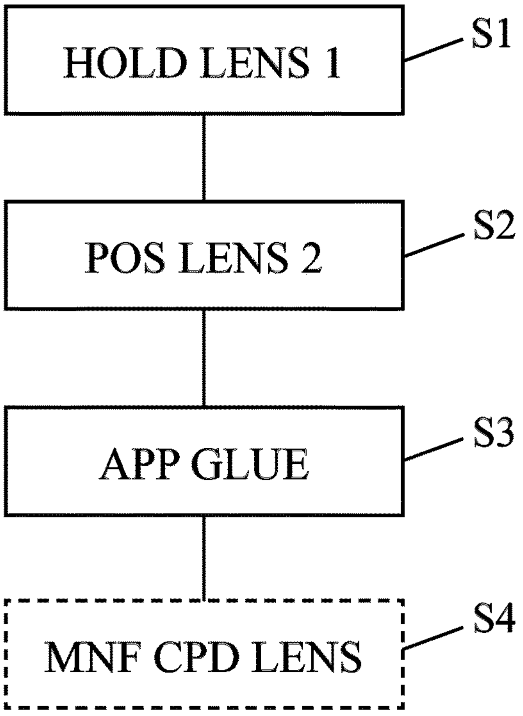
FIG. 5 depicts general steps of a method for manufacturing a compound optical element.

As a result, such manufacturing system allows, as illustrated on FIG. 5, manufacturing a compound optical element by:

- holding S1 a first edged optical element 1 using a first holding device 100,
- positioning S2 a second edged optical element, having the same nominal dimensions as the first edged optical element 1, by the means of a second holding device identical to the first holding device 100, in relation to the first optical element 1,
- applying S3 adhesive material from the inlet onto the held first edged optical element, and
- binding S4 the first edged optical element and the second edged optical element together with the applied adhesive material.

Specifically, the holding devices 100 allow the first edged optical element 1 and the second edged optical element to overlap perfectly, at least over a specific area of the first and second areas of the side surface of the first edged optical element 1.

In addition, the inlet allows spreading the adhesive material onto a main surface of the first edged optical element 1, for example around a closed path. Such closed path may for example extend along the outline of the first edged optical element 1, at a fixed distance of said outline.

Figure 4:
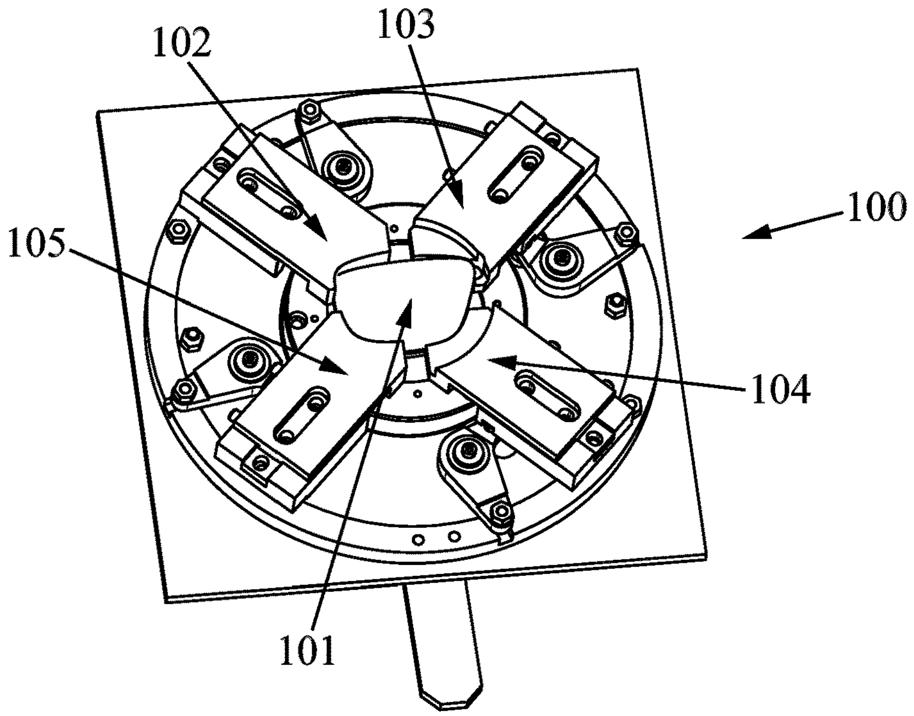
FIG. 4 depicts yet another holding device, according to another exemplary embodiment, for effectively holding the optical element of FIG. 1.

It is now referred to FIG. 4, which depicts another type of holding device 100, which also comprises a base 101 suitable for supporting an edged optical element 1.

More specifically, FIG. 4 depicts the base 101 as a central portion of a centering entity. Such centering entity also comprises a plurality of guiding rails. Each guiding rail is connected, on one of its ends, to the base 101 and may have an adjustable orientation.

The holding device 100 in FIG. 4 differs from the one represented in FIG. 3 in that, rather than pegs, it comprises a plurality of clamps 102, 103, 104, 105.

FIG. 4 depicts the clamps being respectively mounted on a corresponding guiding rail and secured to said rail by a jaw.

Each jaw has a bottom surface inserted in the corresponding guiding rail and a top surface that extends along a horizontal plane and contacts a bottom surface of the clamp it holds. The shape and size of the jaws allow positioning the clamps at the same level. In other words, the jaws are configured so that, when each jaw is inserted in a corresponding rail and holds a corresponding clamp, the bottom surfaces of each clamp are coplanar.

Considering a given guiding rail extending along a main direction, the clamp has a bottom surface having a protruding strip extending along said main direction, and each jaw further has a groove for receiving such protruding strip. This allows configuring the holding device 100 by sliding said clamp onto said jaw to reach a target position onto an axis extending along the main direction of said guiding rail.

Considering any given clamp, the protruding strip of said clamp may be pushed against the groove for example by the means of pushers screwed in the jaws.

The clamps may be machined in the same metal part. Apart from metal, the clamps may alternatively be made out of any other resistant materials known in the art. When the holding device 100 comprises an even number of clamps, the side that makes the line positioning is a common reference for clamps in the opposite position.

For example, the centering tool into the 4 jaws, before the tightening of the guiding rails. Pushers put the jaws and rails at the good position, and we tighten the screws that maintain the rails.

In order to setup the position of the clamps in the rail direction, the grooves of the jaws may comprise mobile stoppers that may be pushed against the centering entity and maintained by screws.

The clamps in FIG. 4 share the same function as that of the pegs in FIG. 3, namely restricting movement of an edged optical element 1 across the same three degrees of freedom.

A frame of reference defined by three perpendicular axis x, y and z is considered, such that the base 101 extends along the xy plane. The clamps 102, 103, 104, 105 extend along a plane parallel to the xy plane and act as stops to delimit an area on the base 101 which size matches predefined dimensions corresponding to the dimensions of the edged optical element 1.

In FIG. 4, four clamps 102, 103, 104, 105 are represented equi-angularly spaced, with a narrow passage in between two adjacent clamps, in order to facilitate positioning the edged optical element 1 in between the clamps and onto the base 1. In particular, with such setup, the edged optical element 1 may be inserted easily by a human operator or by a robot holding said edged optical element 1 at two opposite points of its side surface.

Due to the clamps 102, 103, 104, 105 abutting on the side of the edged optical element 1, the movement of the edged optical element 1, as a whole, is restricted:

in rotation around the z axis, in translation along the x axis, and in translation along the y axis.

Moreover, gravity applies the main surface against the base. Thus, the movement of the optical element is restricted:

in rotation around the x and y axis, and in translation along the z axis.

So, the holding device ensures a complete positioning of the optical element by removing all six degrees of freedom.

Therefore, the clamps 102, 103, 104, 105 are configured so that, when an edged optical element 1 is positioned on the base 101, the clamps collectively abut against a side surface of the edged optical element 1 and, as a result, collectively center the edged optical element 1 by restricting its mobility with respect to three degrees of freedom.

In an example, the holding device may further comprise a gripper being configured so that:

- when the edged optical element is fully positioned on the base and in the clamps, the gripper takes the edged optical element so as to remove all six degrees of freedom.

Further, the gripper may be configured so as to let, when required, the following degrees of freedom free:

rotations around x and y, and translation along z, while the holding device still restricts the following degrees of freedom:

translations along x and y, and rotation along z.

The manufacturing system described above may comprise one, or two, holding devices 100 as defined above, comprising a base 101 and a plurality of clamps 102, 103, 104, 105, rather than holding devices comprising three pegs 110, 120, 130.

Such manufacturing system may further comprise an inlet positioned so as to face a main surface of a first edged optical element 1 when held by the clamps of a first holding device, and be configured to apply adhesive material from the fluid inlet onto said main surface of the first edged optical element, when held by the first holding device.

Such manufacturing system may further comprise a second holding device with clamps, for example with a general structure similar to that of the first holding device, and be configured to manufacture a compound optical element by superimposing a second optical element onto the first optical element.

Indeed, in this regard, such second optical element may not have the same shape and/or size as the first optical element, so that the dimensions of the side surface of the second optical element are different from that of the side surface of the first optical element. As a result, such second optical element cannot be positioned in the same holding device as the first optical element. A second holding device is thus required.

The positioning of the second optical element with respect to the first optical element is described, in an exemplary embodiment, as following.

At an initial instant, the first optical element is centered by the first holding device while the second optical element is centered by the second holding device.

Then, the second optical element is taken by the gripper, keeping only its initial positioning with respect to the following degrees of freedom:

translations along x and y, and rotation around z, the remaining degrees of freedom being let free.

Then, considering an adhesive material has already been applied on the upper surface of the first optical element, forming an adhesive material layer, the second optical element is applied onto the adhesive material layer.

The resulting contact-between the lower main surface of the second optical element and the adhesive material layer coating the upper main surface of the first optical element-establishes the final positioning of the second optical element relative to the first optical element with respect to rotations around x and y and to translation along z.

The gripper then blocks the second optical element in its final positioning as described above, ensuring the movement of the second optical element is kept restricted with respect to all six degrees of freedom.

The invention claimed is:

1. A system comprising:

an edged optical element comprising two opposing main surfaces and a side surface comprising a top area, a nasal area adjacent to the top area, a bottom area adjacent to the nasal area and a temporal area adjacent to top and bottom areas; and a holding device adapted for holding said edged optical element, the holding device comprising:

a base for supporting a main surface of the edged optical element, and three pegs extending from the base and respectively positioned in a contact position defined so that, when the edged optical element is positioned onto the base and two of the three pegs are in contact with a first area among the top, nasal, bottom and temporal areas, the other peg is in contact with a second area among the top, nasal, bottom and temporal areas, wherein the second area is adjacent to the first area when a specific portion of the first or the second area is within a specific position and orientation range about three perpendicular axes.

2. The system according to claim 1, wherein a collective spread of the three pegs is a result of an optimization problem relating to a minimization of the specific position and orientation range about the three perpendicular axes for the edged optical element when positioned onto the base.

3. The system according to claim 1, wherein the edged optical element comprises an edged spectacle lens.

4. The system according to claim 1, wherein at least one of the three pegs is moveable between the contact position and a release position.

5. The system according to claim 1, wherein a first plane is a plane extending along the z-axis and intersecting a center point of the edged optical element and a first peg of the two pegs in contact with the first area, a second plane is a plane extending along the z-axis and intersecting a center point of the edged optical element and a second peg of the two pegs in contact with the first area, a first angle is defined by a convex angle between the first and second planes, a second angle is the convex angle vertically opposite the first angle, and the other peg is disposed outside of the second angle.

6. A manufacturing system comprising:

an edged optical element comprising two opposing main surfaces and a side surface comprising a top area, a nasal area adjacent to the top area, a bottom area adjacent to the nasal area and a temporal area adjacent to top and bottom areas;

a holding device adapted for holding said edged optical element, the holding device comprising:

a base for supporting a main surface of the edged optical element, and three pegs extending from the base and respectively positioned in a contact position defined so that, when the edged optical element is positioned onto the base and two of the three pegs are in contact with a first area among the top, nasal, bottom and temporal areas, the other peg is in contact with a second area among the top, nasal, bottom and temporal areas, wherein the second area is adjacent to the first area when a specific portion of the first or the second area is within a specific position and orientation range about three perpendicular axes; and an inlet positioned so as to face the first area or the second area of the side surface of the edged optical element when held by the holding device, the manufacturing system being configured to apply adhesive material from the inlet onto said edged optical element, when held by the holding device.

7. The manufacturing system according to claim 6, further comprising:

a second edged optical element comprising two opposing second main surfaces and a second side surface comprising a second top area, a second nasal area adjacent to the second top area, a second bottom area adjacent to the second nasal area and a second temporal area adjacent to the second top and second bottom areas, a second holding device adapted for holding said second edged optical element, the second holding device comprising:

a second base for supporting a second main surface of the second edged optical element, and three second pegs extending from the second base and respectively positioned in a contact position defined so that, when the second edged optical element is positioned onto the second base and two of the three second pegs are in contact with a first area, of the second edged optical element, among the second top, second nasal, second bottom and second temporal areas, the other second peg is in contact with a second area of the second edged optical element among the second top, second nasal, second bottom and second temporal areas, wherein the second area of the second edged optical element is adjacent to the first area of the second edged optical element when a specific portion of the first or the second area of the second edged optical element is within a specific second position and second orientation range about three perpendicular axes, the manufacturing system being configured to manufacture a compound optical element by superimposing the second edged optical element held by the second holding device onto the edged optical element held by the holding device after application of the adhesive material.

8. A method for manufacturing a compound optical element, the method comprising:

holding an edged optical element comprising two opposing main surfaces and a side surface comprising a top area, a nasal area adjacent to the top area, a bottom area adjacent to the nasal area and a temporal area adjacent to top and bottom areas, using a holding device, the holding device comprising:

a base for supporting a main surface of the edged optical element, and three pegs extending from the base and respectively positioned in a contact position defined so that, when the edged optical element is positioned onto the base and two of the three pegs are in contact with a first area among the top, nasal, bottom and temporal areas, the other peg is in contact with a second area among the top, nasal, bottom and temporal areas, the second area being adjacent to the first area, when a specific portion of the first or the second area is within a specific position and orientation range about three perpendicular axes;

positioning a second edged optical element comprising two opposing second main surfaces and a second side surface comprising a second top area, a second nasal area adjacent to the top area, a second bottom area adjacent to the second nasal area and a second temporal area adjacent to the second top and second bottom areas, by a second holding device, in relation to the edged optical element, the second holding device comprising:

a second base for supporting a second main surface of the second edged optical element, and three second pegs extending from the second base and respectively positioned in a contact position defined so that, when the second edged optical element is positioned onto the second base and two of the three second pegs are in contact with a first area among the second top, second nasal, second bottom and second temporal areas, the other second peg is in contact with a second area among the second top, second nasal, second bottom and second temporal areas, the second area of the second edged optical element being adjacent to the first area of the second edged optical element, when a specific portion of the first or the second area of the second edged optical element is within a specific second position and second orientation range about three perpendicular axes; and applying adhesive material from an inlet, positioned so as to face the first area or the second area of the side surface of the edged optical element when held by the holding device, onto the held edged optical element, in view of manufacturing the compound optical element comprising, at least, the edged optical element and the second edged optical element, bound together by the adhesive material.

* * * * *